Nov. 30, 1937. H. W. LINDGREN 2,100,339
OPENING DEVICE
Filed Aug. 11, 1934
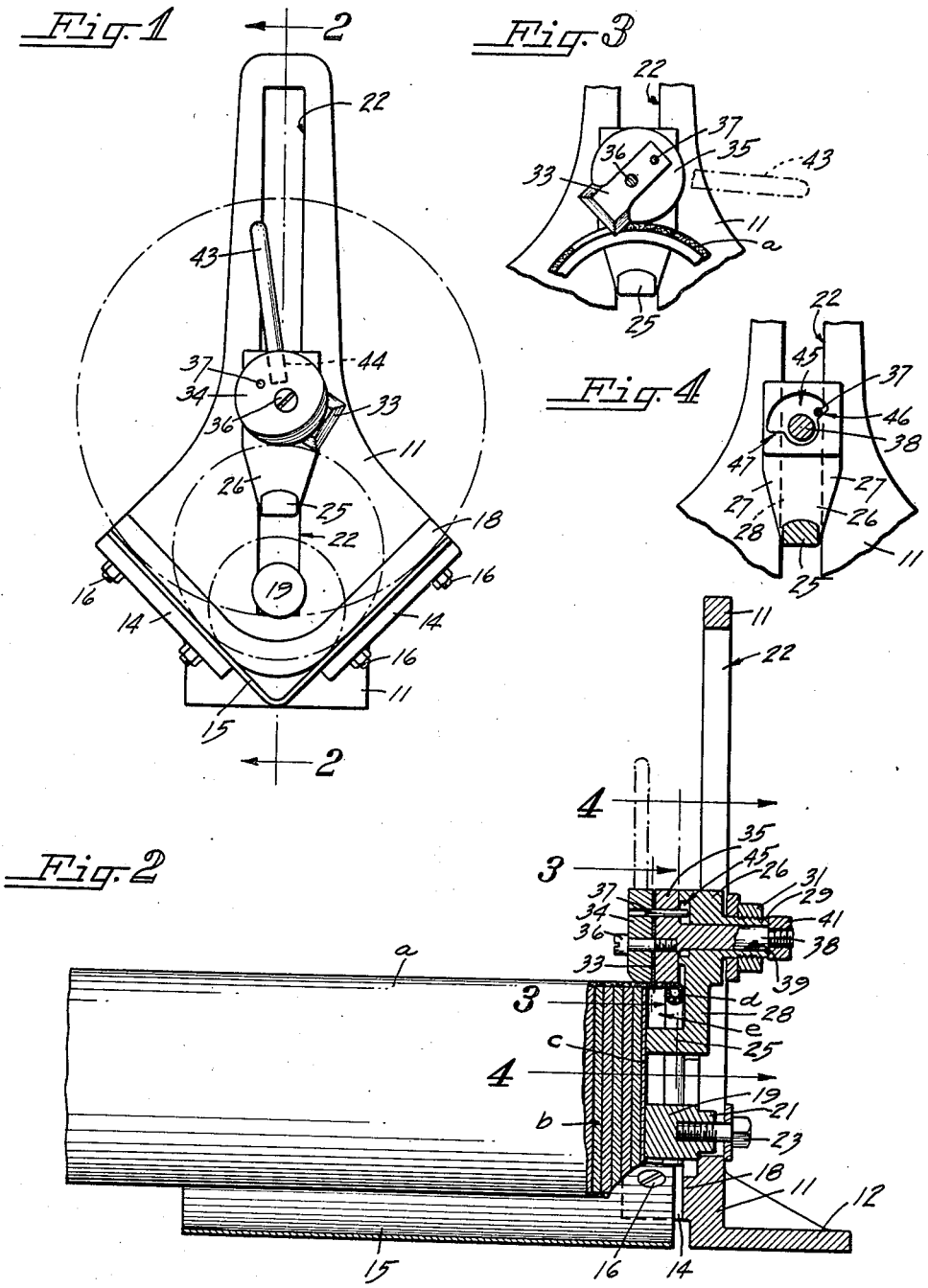
INVENTOR
Henry W. Lindgren
BY
ATTORNEYS Patented Nov. 30, 1937

2,100,339

UNITED STATES PATENT OFFICE 2,100,339

OPENING DEVICE

Henry W. Lindgren, Waukegan, Ill., assignor to American Can Company, New York, N. Y., a corporation of New Jersey Application August 11, 1934, Serial No. 739,487

5 Claims. (Cl. 30—2)

The present invention relates to a container opening tool and has particular reference to an opening tool for cutting off an end of a fiber tube container whereby access may be had to its contents.

An object of the present invention is the provision of a bench tool for cutting off an end of a closed fiber tube container by means of rotation between the container and the tool.

Another object of the invention is the provision in such a tool of a cutting element which is adjustable for cutting fiber tube containers of different diameter sizes, the element including a cutter which is easily detachable and replaceable.

Another object is the provision of a tool of the character described which supports and guides the body of the container during opening and which holds the contents and the container head away from the cutter during the severing operation.

Still another object is the provision of means for holding the cutting element of such a tool in operative position while cutting.

Numerous other objects and advantages of the invention will be apparent as it is better understood from the following description, which, taken in connection with the accompanying drawing, discloses a preferred embodiment thereof.

Referring to the drawing:

Figure 1 is a front elevation of a cutting tool embodying the instant invention;

Fig. 2 is a sectional view taken substantially along the line 2—2 in Fig. 1 and showing a container in position for cutting, parts of the container being broken away; and Figs. 3 and 4 are fragmentary sectional views taken substantially along the lines 3—3 and 4—4, respectively, in Fig. 2.

The opening tool, disclosed in the drawing as exemplifying the instant invention, is manually operated to sever and cut off one end of a tube container such as one formed of fiber or other suitable material.

Such a container preferably comprises a tubular body $a$ adapted to hold stacked contents which are herein illustrated as disc-like articles $b$, such as can ends or similar can parts. The container may be closed at the ends by head or cover members $c$ which engage the ends of the stack and confine the contents in place. These heads are held in article confining position by curls or beads $d$ formed at the ends of the container body by bending the material inwardly and downwardly where it abuts against the heads. To open the container the invention contemplates the cutting off of these curled body ends.

The tool supports the container on its side for the cutting action with an end to be opened adjacent a rocking cutting blade. This end of the tube is held against a plurality of lugs which press the adjacent head and the contents back and away from that end of the container body.

The cutting blade is manually swung into operative position which movement carries it first into engagement with the container wall and then forces it through the wall, this being adjacent the held back contents. The tube is then manually rotated on its longitudinal axis against the now stationary cutter and upon one complete revolution the end of the tube is entirely severed so that access may be freely had to its contents.

The preferred form of tool which is disclosed in the drawing comprises a vertical frame 11 having a horizontal base 12 projecting from one side which supports the various parts of the device. In front the frame opposite the base is formed with a pair of projecting inclined ledges 14 (Figs. 1 and 2) which are disposed at right angles to each other.

One end of a right angle sheet metal trough 15 is secured to the ledges 14 by bolts 16. The trough is open at both ends and is adapted to hold and support any container within a wide range of diametral sizes, three different sizes being indicated by dot and dash lines in Fig. 1.

The container $a$ when positioned in the trough rests on its side as illustrated in Fig. 2 being pushed forward toward the frame 11 as far as it will go which is until its curled edge $d$ engages a raised stop wall 18 which is a front wall of the frame 11 and which is adjacent to and extending between the ledges 14.

During this forward movement of the container as positioned within the trough, the head or cover member $c$ at that end of the tube engages the face of a shouldered spacing lug 19. The lug 19 projects out beyond the front of the frame and is provided with a reduced shank 21 which extends into a vertical slot 22 formed in the frame. A bolt 23 holds the lug in place and is inserted from the back of the frame, extends through the slot and threadedly engages the shank 21 of the lug. Lug 19 is adjusted in the desired position along the slot 22 for the size of container being opened.

The lug 19 pushes back the head $c$ and holds the contents $b$ away from the end of the container and provides a cutting space $e$ between the curl $d$ and the head $c$. A second spacing lug 25 (Figs. 2 and 4) cooperates with the lug 19 for holding the head and contents back.

The lug 25 is formed on the lower end of a block 26 which is cut away at the back and on opposite sides providing front shoulders 27 which are adjacent a central tongue 28 the latter of which extends into and is confined within the slot 22. The rear of the tongue extends back through the slot 22 in a threaded shank 29 and which carries a washer and a locknut 31 by means of which the block is clamped to the frame.

Such a connection provides for locating the block at any desired position on the frame within range of the slot and like the lug 19 is adjustable for the diameter size of container being opened. For containers small in diameter where sufficient space is not available for both lugs, the lug 19 is removed, the lug 25 being quite sufficient at such a time.

The block 26 carries the cutting element used in opening the container, which comprises a detachable and replaceable blade 33 (Fig. 3) which is clamped between a pair of discs 34, 35. The discs are secured together by a screw 36 and are aligned by a pin 37. The disc 35 is formed as a head for a stud 38 which is held in a bore 39 formed in the block 26 and in its shank 29. The tail end of the stud is threaded and carries a locknut 41 which holds the cutting element in position in the block.

With the container in fully seated position in the trough 15 with its curled edge in engagement with the stop wall 18 and its head and contents held back by the lugs 19, 25, the cutting blade or cutter 33 is directly in line with and just above the open space e of the container. When the cutting element is manually turned on its stud 38 in a clockwise direction as viewed in Fig. 1 it comes into effective cutting position. For this purpose a handle rod 43 is secured in the edge of the disc 34, the rod being driven into a tight peripheral fitting bore 44.

The blade, having previously been adjusted for a particular diameter size of container, cuts through the container wall and projects into the space e, a stop limiting the degree of movement. This stop includes a fan shaped recess 45 (Figs. 2 and 4) formed in the face of the block 26 and which is bounded with stop edge walls 46, 47. The rear end of the pin 37 projects into the recess 45 and provides the other part of the stop member. When the cutter is in fully inserted and operative position the pin 37 abuts the stop edge 46. The opposite edge 47 is used for the inoperative position.

The container is manually revolved in the trough 15 and its wall is forced progressively against the now stationary blade 33. It is also simultaneously pressed forward so that its curled end is kept in contact with the stop wall 18. In one revolution of the container its curled end is completely severed and access to its contents is at once made available.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A tool for severing the end of fiber tube containers of varying diameters, comprising in combination, a stationary frame having a vertical portion and a trough member associated therewith for selectively supporting containers of different diameter sizes, and a cutting element pivotally mounted in the vertical portion of said frame and slidable bodily therein in a direction transverse to the container to be cut whereby to engage containers of varying diameters, said cutting element being adapted to be rocked on its axis into engagement with a supported container to pierce a wall of the same and for thereafter severing an end of a said container during rotation of the container relative to said tool.

2. A tool for severing the end of fiber tube containers of varying diameters, comprising in combination, a frame for holding and guiding a container to be opened and in which said container may be revolved on its longitudinal axis, a cutting element slidable bodily in said frame in a direction transverse to the longitudinal axis of the container whereby to engage the body wall of containers of varying diameters, said cutting element operating while stationary and in engagement with a container to sever an end of said container during the latter's rotation, and means mounted on said frame and engaging an end wall of said container radially inwardly from said cutting element for holding the contents of said container away from the end thereof to provide a cutting space for said cutting element.

3. A tool for severing the end of fiber tube containers of varying diameters, comprising in combination, a stationary frame having a trough member for holding and guiding a container to be opened and having an upstanding portion at one end of said trough member, a cutting element slidably and pivotally mounted in the upstanding portion of said frame and movable as a unit towards and from said trough member, said cutting element operating while in one position to sever an end of a held container during relative rotation between it and said tool, and stop means associated with said cutting element for limiting its oscillatory movement in both directions and for holding it in a predetermined operating position, the slidable mounting of said cutting element permitting its being moved into engagement with containers of varying diameters selectively supported by said trough member.

4. A tool for severing the end of fiber tube containers of varying diameters, comprising in combination, a stationary frame having a trough member for supporting in fixed position a container to be opened and having an upstanding portion at one end of said trough member, a cutting element slidably and pivotally mounted in the upstanding portion of said frame so as to be movable as a unit towards and away from the body wall of a container in said trough member, said cutter element having a detachable and replaceable cutter blade operable to sever an end of a held container during relative rotation between it and said tool.

5. A tool for severing the end of a fiber tube container comprising in combination, a stationary frame having a trough for holding and supporting a container to be opened and having an upstanding portion at one end of said trough, and a cutting element slidably mounted in the upstanding portion of said frame in a direction transverse to the container to be cut, whereby said cutting element is operable to engage and sever an end of containers of varying diameters during rotation of the container relative to the stationary cutting element.

HENRY W. LINDGREN.